US 008589502B2

(12) United States Patent
O'Sullivan et al.

(10) Patent No.: US 8,589,502 B2
(45) Date of Patent: *Nov. 19, 2013

(54) SYSTEM AND METHOD FOR ALLOWING ACCESS TO CONTENT

(75) Inventors: Patrick Joseph O'Sullivan, Ballsbridge (IE); Edith Helen Stern, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

This patent is subject to a terminal disclaimer.

(21) Appl. No.: 12/347,644

(22) Filed: Dec. 31, 2008

(65) Prior Publication Data

US 2010/0169439 A1 Jul. 1, 2010

(51) Int. Cl.
*G06F 15/16* (2006.01)
(52) U.S. Cl.
USPC .......................................... 709/207; 709/206
(58) Field of Classification Search
USPC .................. 709/206, 207, 217, 219, 225, 229
See application file for complete search history.

(56) References Cited

U.S. PATENT DOCUMENTS

| 5,479,472 | A | * | 12/1995 | Campana et al. | 455/412.1 |
| 5,996,011 | A | * | 11/1999 | Humes | 709/225 |
| 6,052,486 | A | * | 4/2000 | Knowlton et al. | 382/232 |
| 6,275,848 | B1 | * | 8/2001 | Arnold | 709/206 |
| 6,484,156 | B1 | * | 11/2002 | Gupta et al. | 707/802 |
| 6,523,012 | B1 | | 2/2003 | Glassman et al. | |
| 6,563,913 | B1 | * | 5/2003 | Kaghazian | 379/93.24 |
| 6,687,741 | B1 | | 2/2004 | Ramaley et al. | |
| 7,181,438 | B1 | * | 2/2007 | Szabo | 1/1 |
| 7,487,128 | B2 | * | 2/2009 | Spagna et al. | 705/51 |
| 7,720,828 | B2 | * | 5/2010 | Bookstaff | 707/705 |
| 7,870,206 | B2 | | 1/2011 | Heidloff et al. | |
| 8,112,482 | B1 | * | 2/2012 | Geddes | 709/206 |
| 8,140,847 | B1 | * | 3/2012 | Wu | 713/175 |
| 8,321,437 | B2 | * | 11/2012 | Lim | 707/758 |
| 8,359,355 | B2 | * | 1/2013 | O'Sullivan et al. | 709/206 |
| 8,364,148 | B2 | * | 1/2013 | Dravida et al. | 455/435.2 |
| 8,386,573 | B2 | * | 2/2013 | O'Sullivan et al. | 709/206 |
| 8,407,345 | B2 | * | 3/2013 | Lim | 709/225 |

(Continued)

FOREIGN PATENT DOCUMENTS

| EP | 1 411 430 A3 | 4/2008 |
| WO | 0072226 A2 | 11/2000 |

OTHER PUBLICATIONS

Schwartz, Randal L., "Web Wandering for Broken Links", New Architect: Programming with Perl, http://www.webtechniques.com/archives/1996/10, 10 pages.

(Continued)

*Primary Examiner* — Sargon Nano
(74) *Attorney, Agent, or Firm* — Holland & Knight LLP; Brian J. Colandreo, Esq.; Jeffrey T. Placker, Esq.

(57) ABSTRACT

A method, computer program product, and computing system for receiving an indication of an email being generated by a composer for at least one recipient. The email includes a link to a piece of content on a remote resource and the at least one recipient does not have sufficient rights to access the remote resource. The recipient may be allowed to access the remote resource via the link using the rights of the composer.

20 Claims, 4 Drawing Sheets

(56) References Cited

U.S. PATENT DOCUMENTS

| | | | |
|---|---|---|---|
| 2002/0059236 A1* | 5/2002 | Satoh | 707/9 |
| 2002/0059525 A1* | 5/2002 | Estes et al. | 713/200 |
| 2002/0107931 A1* | 8/2002 | Singh et al. | 709/206 |
| 2003/0152273 A1* | 8/2003 | McCormack et al. | 382/203 |
| 2003/0237005 A1* | 12/2003 | Bar-Or et al. | 713/201 |
| 2004/0034688 A1 | 2/2004 | Dunn | |
| 2004/0034774 A1 | 2/2004 | Le Saint | |
| 2004/0073530 A1 | 4/2004 | Stringer-Calvert et al. | |
| 2004/0073801 A1 | 4/2004 | Kalogridis et al. | |
| 2004/0078334 A1* | 4/2004 | Malcolm et al. | 705/50 |
| 2004/0153515 A1* | 8/2004 | Touboul et al. | 709/206 |
| 2004/0243832 A1* | 12/2004 | Wilf et al. | 713/200 |
| 2005/0033813 A1 | 2/2005 | Bhogal et al. | |
| 2005/0086313 A1* | 4/2005 | Lucas et al. | 709/206 |
| 2005/0193145 A1* | 9/2005 | Brown et al. | 709/238 |
| 2005/0289446 A1 | 12/2005 | Moncsko et al. | |
| 2006/0031350 A1* | 2/2006 | Levi et al. | 709/206 |
| 2006/0184628 A1 | 8/2006 | Coley et al. | |
| 2007/0113069 A1* | 5/2007 | Gentil et al. | 713/100 |
| 2008/0162353 A1* | 7/2008 | Tom et al. | 705/51 |
| 2008/0256187 A1* | 10/2008 | Kay | 709/206 |
| 2008/0263103 A1* | 10/2008 | McGregor et al. | 707/200 |
| 2008/0263155 A1* | 10/2008 | Bhogal et al. | 709/205 |
| 2009/0077182 A1* | 3/2009 | Banjara et al. | 709/206 |
| 2009/0100346 A1* | 4/2009 | O'Sullivan et al. | 715/743 |
| 2009/0100529 A1* | 4/2009 | Livnat et al. | 726/28 |
| 2009/0319623 A1* | 12/2009 | Srinivasan et al. | 709/206 |
| 2009/0328156 A1* | 12/2009 | Malaviarachchi et al. | 726/4 |
| 2010/0169295 A1* | 7/2010 | Kanamori | 707/706 |
| 2010/0169440 A1* | 7/2010 | O'Sullivan et al. | 709/206 |
| 2011/0167433 A1* | 7/2011 | Appelbaum et al. | 719/318 |

OTHER PUBLICATIONS

Fowler, et al., "The evolution of a manufacturing Web site", Computer Networks, Proceedings of the 9th International World Wide Web Conference, The Web: The Next Generation, May 15-19, 2000, vol. 33, pp. 365-376.

* cited by examiner

SYSTEM AND METHOD FOR ALLOWING ACCESS TO CONTENT

TECHNICAL FIELD

This disclosure relates to email messages that include embedded links and, more particularly, to email messages that include embedded links to content stored on a restricted-access resource.

BACKGROUND

Today, email may be used as a general tool for broad collaboration. Email has led to an explosion of messaging in which many people are copied/respond and use this mechanism to e.g., communicate, and share content. However, the mechanisms that we have to send, receive and process email and content therein do not lend themselves to collaboration.

For example, the explosion of messaging has resulted in situations where codependent technologies represent an obstacle to effective collaboration. Specifically, the association of a link in an email with document libraries, team rooms, or content within databases is a very powerful capability that allows an email recipient to select a link that in turn brings them to a central repository that stores the information referenced. This, in turn, keeps email messages short and concise, thus reducing duplication and unnecessary propagation of content.

Unfortunately, circumstances often arise in which an email recipient may not have access to the content being referenced, as the associated access to the repository limits access to a restricted group that may exclude some members of the recipient list. This often creates manual process challenges that involve coming to terms with the databases owner, seeking access, granting access and returning to the email once again when access has been granted to reference the content in question, thus creating displacement and discontinuity for the recipient.

SUMMARY OF DISCLOSURE

In a first implementation, a method includes receiving an indication of an email being generated by a composer for at least one recipient. The email includes a link to a piece of content on a remote resource and the at least one recipient does not have sufficient rights to access the remote resource. The recipient may be allowed to access the remote resource via the link using the rights of the composer.

One or more of the following features may be included. The link may be associated with the rights of the composer. Associating the link with the rights of the composer may include associating the link with the rights of the composer for a finite period of time. Associating the link with the rights of the composer may include modifying the link to define the rights of the composer.

If the at least one recipient includes a recipient having sufficient rights to access the remote resource, the email may be transmitted to the recipient having sufficient rights to access the remote resource without associating the link with the rights of the composer.

The at least one recipient may includes a first recipient who has sufficient rights to access the remote resource, and a second recipient who does not have sufficient rights to access the remote resource. Transmission of the email to the first recipient may be allowed without associating the link with the rights of the composer. Transmission of the email to the second recipient may be allowed after associating the link with the rights of the composer.

A warning may be provided to the composer of the email if the at least one recipient includes a recipient not having sufficient rights to access the remote resource. The remote resource may be chosen from the group consisting of a server computer, a collaborative workspace, a database, and a website.

In another implementation, a computer program product resides on a computer readable medium that has a plurality of instructions stored on it. When executed by a processor, the instructions cause the processor to perform operations including receiving an indication of an email being generated by a composer for at least one recipient. The email includes a link to a piece of content on a remote resource and the at least one recipient does not have sufficient rights to access the remote resource. The recipient may be allowed to access the remote resource via the link using the rights of the composer.

One or more of the following features may be included. The link may be associated with the rights of the composer. Associating the link with the rights of the composer may include associating the link with the rights of the composer for a finite period of time. Associating the link with the rights of the composer may include modifying the link to define the rights of the composer.

If the at least one recipient includes a recipient having sufficient rights to access the remote resource, the email may be transmitted to the recipient having sufficient rights to access the remote resource without associating the link with the rights of the composer.

The at least one recipient may includes a first recipient who has sufficient rights to access the remote resource, and a second recipient who does not have sufficient rights to access the remote resource. Transmission of the email to the first recipient may be allowed without associating the link with the rights of the composer. Transmission of the email to the second recipient may be allowed after associating the link with the rights of the composer.

A warning may be provided to the composer of the email if the at least one recipient includes a recipient not having sufficient rights to access the remote resource. The remote resource may be chosen from the group consisting of a server computer, a collaborative workspace, a database, and a website.

In another implementation, a computing system includes at least one processor and at least one memory architecture coupled with the at least one processor. A first software module is executed on the at least one processor and the at least one memory architecture. The first software module is configured to receive an indication of an email being generated by a composer for at least one recipient. The email includes a link to a piece of content on a remote resource and the at least one recipient does not have sufficient rights to access the remote resource. A second software module is executed on the at least one processor and the at least one memory architecture. The second software module is configured to allow the recipient to access the remote resource via the link using the rights of the composer.

One or more of the following features may be included. A third software module may be executed on the at least one processor and the at least one memory architecture. The third software module may be configured to associate the link with the rights of the composer. Associating the link with the rights of the composer may include associating the link with the rights of the composer for a finite period of time. Associating the link with the rights of the composer may include modifying the link to define the rights of the composer.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
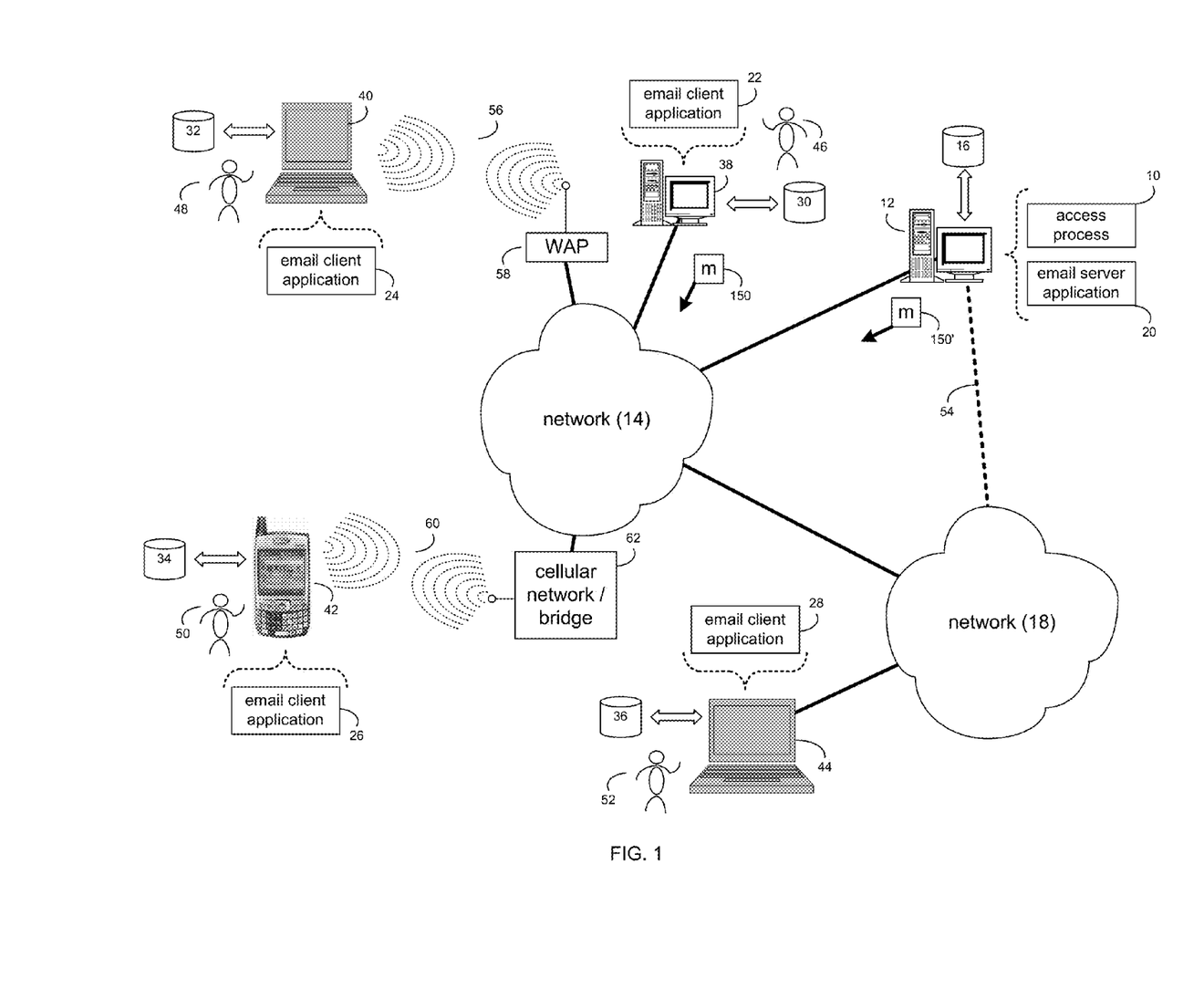
FIG. 1 is a diagrammatic view of an access process and an email client application coupled to a distributed computing network.

System Overview:

Referring to FIG. 1, there is shown access process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, access process 10 may receive an indication of an email being generated by a composer for at least one recipient. The email may include a link to a piece of content on a remote resource and the at least one recipient may not have sufficient rights to access the remote resource. The recipient may be allowed to access the remote resource via the link using the rights of the composer.

The instruction sets and subroutines of access process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino™ Server and Microsoft Exchange™ Server. Email server application 20 may be a mail transfer agent that may store and route email to one or more email client applications 22, 24, 26, 28, examples of which may include but are not limited to Lotus Notes™ and Microsoft Outlook™. Access process 10 may be a stand alone application that interfaces with email server application 20 or an applet/application that is executed within email server application 20.

The instruction sets and subroutines of email server application 20, which may be stored on storage device 16 coupled to server computer 12 may be executed by one or more processors (not shown) and one or more memory architectures (not shown) incorporated into server computer 12.

The instruction sets and subroutines of email client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may retrieve and/or organize email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

The Access Process:

For the following discussion, email client application 22 is going to be described for illustrative purposes. However, this is not intended to be a limitation of this disclosure, as other email client applications (e.g., email client applications 24, 26, 28) may be equally utilized.

Figure 2:
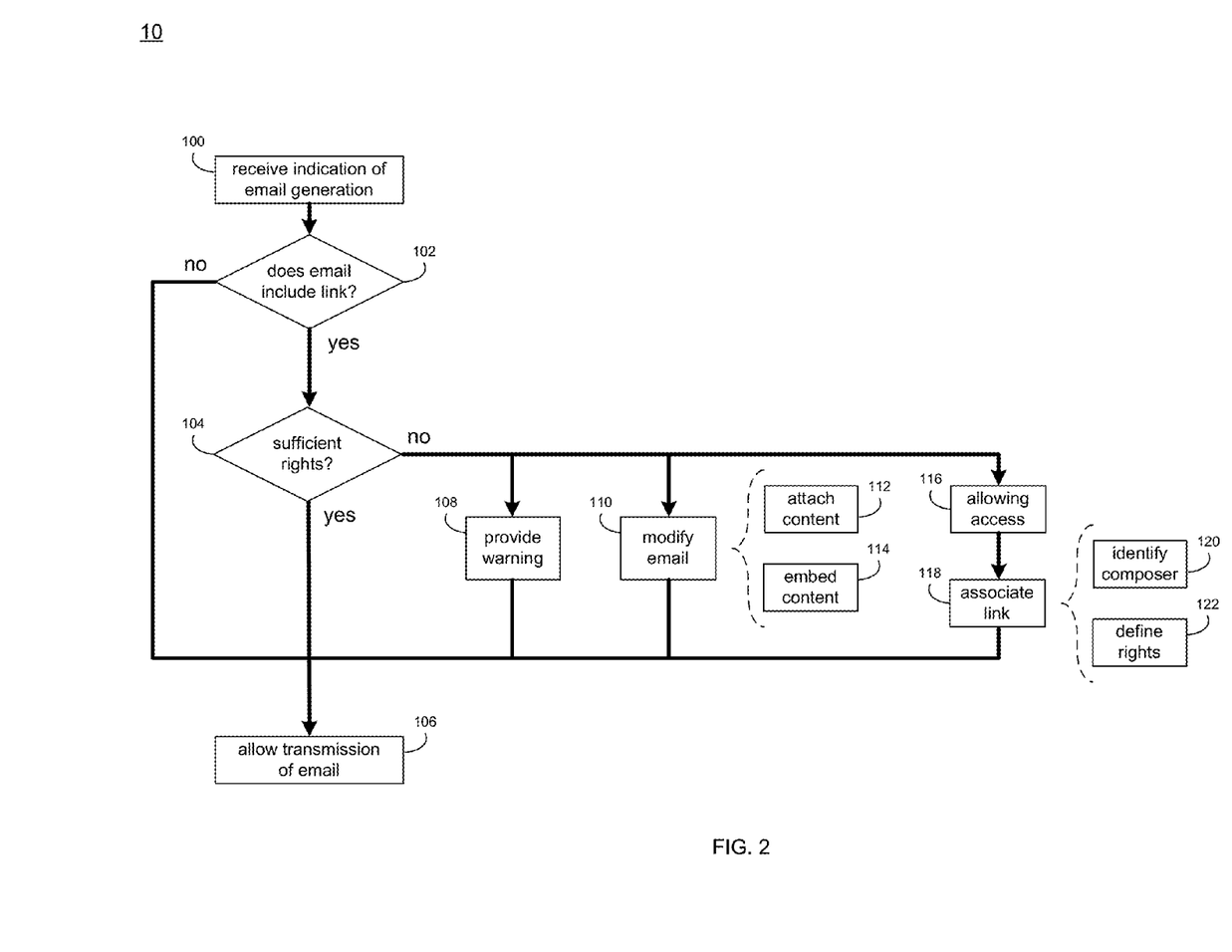
FIG. 2 is a flowchart of the access process of FIG. 1.
Figure 3:
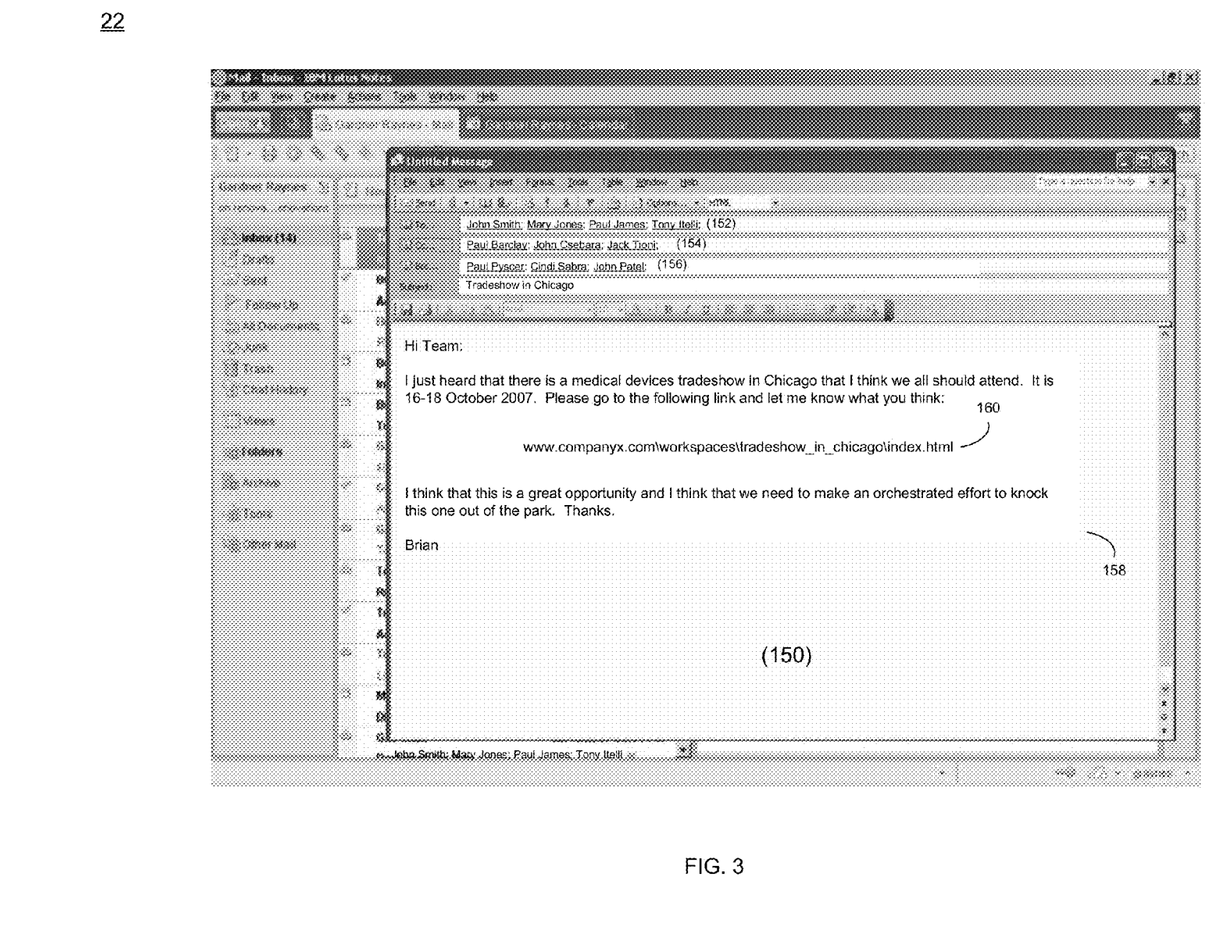
FIG. 3 is a diagrammatic view of a display screen rendered by the email client application of FIG. 1.

Referring also to FIGS. 2 & 3, email client application 22 (alone or in combination with access process 10 and/or email server application 20) may allow a user (e.g., user 46) to generate email message 150 that is addressed to one or more recipients. As is known in the art, email message 150 may be addressed to "TO" recipients 152, "CC" (i.e., carbon copy) recipients 154, and "BCC" (i.e., blind carbon copy) recipients 156. Further and as is known in the art, email message 150 may include message content 158 (i.e., the body of the email message).

Upon access process 10 receiving 100 an indication of an email (e.g., email message 150) being generated for transmission to at least one recipient, access process 10 may analyze email 150 to determine if the email includes a link to a piece of content on a remote resource. Examples of the remote resource may include but are not limited to: a server computer (e.g., server computer 12), a database (e.g., a database served by server computer 12 and stored on storage device 16 coupled to server computer 12), a website (e.g., a website served by server computer 12 or another server; not shown), and a collaborative workspace.

Examples of a collaborative workspace may include but are not limited to: a wiki; a blog; a team space; a discussion group; and an activity group.

A wiki is a website that may allow visitors to add, remove, and edit content. A collaborative technology for organizing information on websites, wikis may allow for linking amongst any number of webpages. Wikis may be editable by the general public.

A blog is a website in which entries may be written in a chronological order and may be displayed in reverse chronological order. Blogs may provide commentary or news on a particular subject such as food, politics, or local news; or may function as a personal online diary.

A team space is a web-based collaborative workspace for managing shared work processes and maintaining shared artifacts in a project that may span months or years. A teamspace may cover both synchronous and asynchronous cross-company team activities and may provide a seamless transition between different work modes.

A discussion group is a web application for holding discussions and posting user-generated content. The term "group" may refer to the entire community or to a specific sub-forum dealing with a distinct topic. Messages within a sub-forum may be displayed either in chronological order or as threaded discussions.

When analyzing e-mail 150 to determine if 102 e-mail 150 includes a link to a piece of content on a remote resource, access process 10 may analyze e-mail message 150 for the presence of one or more terms indicative of a link. Examples of such terms indicative of a link may include but are not limited to a server name, a computer name, a disk drive name, a uniform resource locator, a Web address, a database name, and a collaborative workspace name, for example. While the foregoing list is intended to be illustrative, it is not intended to be all-inclusive nor is it intended to be a limitation of this disclosure.

In this particular example, e-mail 150 is shown to include a link 160 as follows:

www.companyx.com\workspaces\tradeshow_in_chicago\index.html

Assume, for illustrative purposes, that link 160 defines a piece of content (e.g., index.html) available on a remote resource (e.g., the website of "Company X"). Further, assume that link 160 is a link to a website within an intranet that is only available to authorized employees of "Company X". Accordingly, as link 160 is a link to an intranet website, in order to access the piece of content (e.g., index.html) available on remote resource (e.g., the intranet of "Company X"), the recipient of e-mail 150 may be required to have sufficient rights to access this piece of content.

In this particular example, email message 150 is shown to be addressed to: "TO" recipients 152 (e.g., John Smith, Mary Jones, Paul James & Tony Itelli); "CC" recipients 154 (e.g., Paul Barclay, John Csebara & Jack Tioni); and "BCC" recipients 156 (e.g., Paul Pyscer, Cindi Sabra & John Patel). Assume for illustrative purposes that all but two recipients (e.g., Paul Barclay and John Patel) are employees of "Company X".

As discussed above, access process 10 may analyze e-mail 150 to determine if 102 email 150 includes a link to a piece of content included on a remote resource. If 102 access process 10 determines that e-mail 150 includes a link to a piece of content on a remote resource, the recipient(s) defined within e-mail 150 may be analyzed to determine if 104 the recipient(s) have sufficient rights to access the piece of content on the remote resource.

When analyzing e-mail 150 to determine if the intended recipient(s) of e-mail 150 have sufficient rights to access the piece of content on the remote resource, each member of the list of intended recipients may be analyzed to determine if each recipient has sufficient rights. For example and as discussed above, e-mail 150 is addressed to ten intended recipients, namely John Smith, Mary Jones, Paul James, Tony Itelli, Paul Barclay, John Csebara, Jack Tioni, Paul Pyscer, Cindi Sabra and John Patel.

As discussed above, assume for illustrative purposes that all but two recipients (e.g., Paul Barclay and John Patel) are employees of "Company X". Accordingly, when analyzing the intended recipients of e-mail 150 to determine if each of the recipients has sufficient rights to access the piece of content on the remote resource, access process 10 may determine that eight of the intended recipients (namely John Smith, Mary Jones, Paul James, Tony Itelli, John Csebara, Jack Tioni, Paul Pyscer, and Cindi Sabra) are employees of "Company X". Access process 10 may make this determination by comparing each of these eight intended recipients to the employee e-mail distribution list of "Company X". Naturally and for illustrative purposes, this assumes that within "Company X", these eight intended recipients have sufficient rights to access this piece of content on this remote resource.

Further, assume for illustrative purposes that since recipients Paul Barclay and John Patel are not employees of "Company X", they will not have access to the piece of content on the remote resource (as defined by link 160), namely index.html on the intranet of "Company X".

If 104 access process 10 determines that at least one recipient has sufficient rights to access the remote resource, email 150 may be allowed to be transmitted 106 to the intended recipient. Continuing with the above stated example, as e-mail 150 is addressed to ten intended recipients and eight of the intended recipients (namely John Smith, Mary Jones, Paul James, Tony Itelli, John Csebara, Jack Tioni, Paul Pyscer, and Cindi Sabra) have sufficient rights to access the remote resource, access process 10 may allow 106 e.g. email server application 22 to transmit e-mail message 152 to a portion of the intended recipients (namely John Smith, Mary Jones, Paul James, Tony Itelli, John Csebara, Jack Tioni, Paul Pyscer, and Cindi Sabra).

However, concerning two of the intended recipients (e.g. Paul Barclay and John Patel), access process 10 may not immediately allow 106 e.g. email server application 22 to transmit e-mail 152 to intended recipients Paul Barclay and John Patel.

If 104 at least one of the recipients does not have sufficient rights to access the remote resource, access process 10 may provide 108 a warning to the composer (e.g., user 26) of email message 150 concerning the recipient(s) that do not have sufficient rights to access the remote resource. Continuing with the above-stated example and as discussed above, two intended recipients, namely Paul Barclay and John Patel, do not have sufficient rights to access the remote resource defined by link 160. Accordingly access process 10 may provide to user 26 a warning concerning the fact that these two recipients do not have access to the remote resource.

Figure 4:
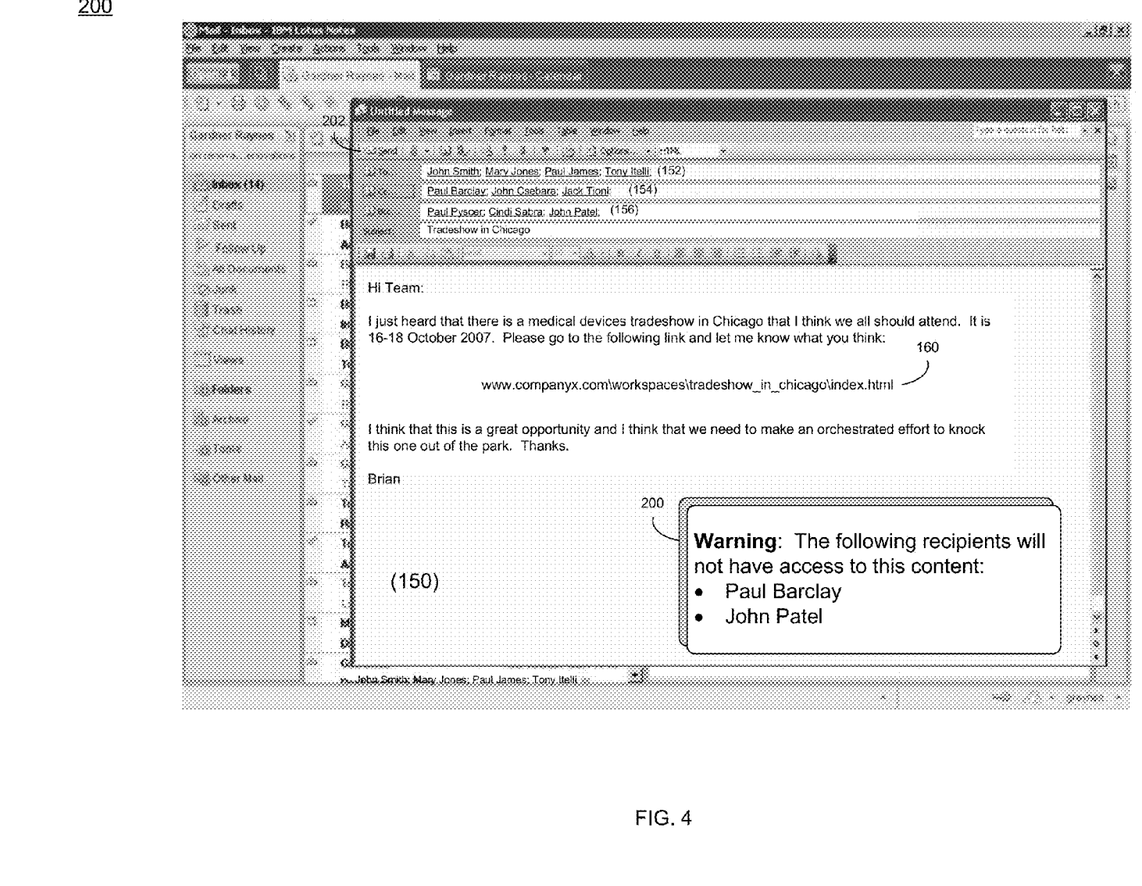
FIG. 4 is a diagrammatic view of a display screen rendered by the access process and/or email client application of FIG. 1.

Referring also to FIG. 4, access process 10 may provide 108 user 26 (e.g., in the form of pop-up warning window 200) with a warning concerning the fact that at least one intended recipient (namely Paul Barclay and John Patel) do not have sufficient rights to access the remote resource defined by link 160. The manner in which access process 10 provides a warning to user 26 (e.g. pop-up warning window 200) is for illustrative purposes only and is not intended to be a limitation of this disclosure. Specifically, access process 10 may provide a warning to user 26 in various other manners, such as an audible beep or an inability to select send button 202.

By providing 108 a warning to user 26, access process 10 may allow user 26 to e.g. delete recipients Paul Barclay and John Patel from the intended recipients list; or access process 10 may provide the content located on a remote resource (to which they do not have access) using alternative distribution means.

One illustrative example of such an alternative distribution means may include access process 10 modifying 110 e-mail 150 to generate modified email 150', which may then be transmitted 106 to the intended recipients.

When modifying 110 email 150, access process 10 may attach 112 a copy of the piece of content (defined by link 160) to email 150 to generate modified email 150'. For example, a copy of index.html may be attached 112 to e-mail 150, thus allowing recipients Paul Barclay and/or John Patel to review the piece of content pointed to by link 160 regardless of the fact that recipients Paul Barclay and/or John Patel do not have access to the remote resource pointed to by link 160. Accordingly, in the event that the piece of content is a word processing document (e.g. content.doc), access process 10 may attach 112 a copy of the word processing document to e-mail 150 to allow for review by Paul Barclay and/or John Patel. Similarly, in the event that the piece of content is a database record, access process 10 may attach 112 a copy of the database record to e-mail 150 to allow intended recipients Paul Barclay and/or Jeff Patel to review the database record.

As an alternative to attaching 112 a copy of the piece of content to e-mail 150, access process 10 may modify 110 email 150 by embedding 114 a copy of the piece of content within the email to generate the modified email 150'. For example, modified e-mail 150' may be an HTML-based e-mail into which the content of index.html (as pointed to by link 160) is copied. Accordingly, by embedding the content pointed to by link 160 into e-mail 150, intended recipients Paul Barclay and/or John Patel may be able to review the piece of content pointed to by link 160 regardless of the fact that recipients Paul Barclay and/or Jeff Patel do not have access to the remote resource pointed to by link 160.

As discussed above, access process 10 may provide the content located on the remote resource (to which the recipient does not have access) using alternative distribution means.

Another illustrative example of such an alternative distribution means may include access process 10 allowing 116 the recipient (e.g., Paul Barclay and/or John Patel; neither of whom have sufficient rights to access the remote resource) to access the remote resource via link 160 using the rights of the composer (e.g., user 26) of email 150 as a rights-proxy of the composer. Accordingly, access process 10 may associate 118 link 160 with the rights of user 26.

For example, access process 10 may modify link 160 to identify 120 the composer of e.g., email 150. Accordingly, when the recipient (e.g., Paul Barclay and/or John Patel) receives email 150 and selects link 160, upon trying to access the data resource on which:
 www.companyx.com\workspaces\tradeshow_in_chicago\index.html
is stored, access process 10 may allow 116 the recipient of email 150 (e.g., Paul Barclay and/or John Patel) to gain access to the data resource using the rights of user 26 (i.e., the composer of email 150).

Alternatively, access process 10 may modify link 160 to define 122 the rights of the composer of e.g., email 150. Accordingly, assume that the composer of email 150 has "Company X" employee-level rights (that are sufficient to grant them access to the data resource) and the recipient of email 150 (e.g., Paul Barclay and/or John Patel) do not have "Company X" employee-level rights (that are insufficient to grant them access to the data resource). Accordingly, when the recipient (e.g., Paul Barclay and/or John Patel) receives email 150 and selects link 160, upon trying to access the data resource on which:
 www.companyx.com\workspaces\tradeshow_in_chicago\index.html
is stored, access process 10 may allow 116 the recipient of email 150 (e.g., Paul Barclay and/or John Patel) to gain access to the data resource by granting them "Company X" employee-level rights with respect to email 150.

When associating 118 link 160 with the rights of the composer of email 150 (i.e., user 26), access process 10 may only associate link 160 with the rights of composer of email 150 for a finite period of time. Accordingly, the recipient of email 150 (e.g., Paul Barclay and/or John Patel) may be able to access the data resource on which:
 www.companyx.com\workspaces\tradeshow_in_chicago\index.html
is stored for only a defined period of time (e.g., an hour, a day, a week, or a month). Accordingly, at some point in the future, access process 10 may rescind the supplement rights provided to e.g., the recipient of email 150, thus preventing the recipient of email 150 from being able to access the data resource after such a rescission of the supplemental rights.

A number of implementations have been described. Nevertheless, it will be understood that various modifications may be made. Accordingly, other implementations are within the scope of the following claims.

What is claimed is:

1. A method comprising:
 receiving an indication of an email being generated by a composer for at least one recipient, wherein the email includes a link to a piece of content on a remote resource;
 determining, prior to transmission of the email, the at least one recipient does not have sufficient rights to access the remote resource; and
 automatically allowing the recipient to access the remote resource via the link as a rights-proxy of the composer, wherein accessing the remote resource as a rights-proxy of the composer includes accessing the remote resource using credentials of the composer of the email.

2. The method of claim 1 wherein allowing the recipient to access the remote resource via the link as a rights-proxy of the composer includes associating the link with the rights of the composer.

3. The method of claim 2 wherein associating the link with the rights of the composer includes:
associating the link with the rights of the composer for a finite period of time.

4. The method of claim 2 wherein associating the link with the rights of the composer includes:
modifying the link to define the rights of the composer.

5. The method of claim 2 further comprising:
if the at least one recipient includes a recipient having sufficient rights to access the remote resource, transmitting the email to the recipient having sufficient rights to access the remote resource without associating the link with the rights of the composer.

6. The method of claim 2 wherein the at least one recipient includes a first recipient who has sufficient rights to access the remote resource, and a second recipient who does not have sufficient rights to access the remote resource; the method further comprising:
allowing transmission of the email to the first recipient without associating the link with the rights of the composer; and
allowing transmission of the email to the second recipient after associating the link with the rights of the composer.

7. The method of claim 1 further comprising:
providing a warning to the composer of the email if the at least one recipient includes a recipient not having sufficient rights to access the remote resource.

8. The method of claim 1 wherein the remote resource is chosen from the group consisting of a server computer, a collaborative workspace, a database, and a website.

9. A computer program product residing on a non-transitory computer readable medium having a plurality of instructions stored thereon which, when executed by a processor, cause the processor to perform operations comprising:
receiving an indication of an email being generated by a composer for at least one recipient, wherein the email includes a link to a piece of content on a remote resource;
determining, prior to transmission of the email, the at least one recipient does not have sufficient rights to access the remote resource; and
automatically allowing the recipient to access the remote resource via the link as a rights-proxy of the composer, wherein accessing the remote resource as a rights-proxy of the composer includes accessing the remote resource using credentials of the composer of the email.

10. The computer program product of claim 9, wherein the instructions for allowing the recipient to access the remote resource via the link as a rights-proxy for the composer further includes instructions for:
associating the link with the rights of the composer.

11. The computer program product of claim 10 wherein the instructions for associating the link with the rights of the composer include instructions for:
associating the link with the rights of the composer for a finite period of time.

12. The computer program product of claim 10 wherein the instructions for associating the link with the rights of the composer include instructions for:
modifying the link to define the rights of the composer.

13. The computer program product of claim 10 further comprising instructions for:
if the at least one recipient includes a recipient having sufficient rights to access the remote resource, transmitting the email to the recipient having sufficient rights to access the remote resource without associating the link with the rights of the composer.

14. The computer program product of claim 10 wherein the at least one recipient includes a first recipient who has sufficient rights to access the remote resource, and a second recipient who does not have sufficient rights to access the remote resource; the method further comprising instructions for:
allowing transmission of the email to the first recipient without associating the link with the rights of the composer; and
allowing transmission of the email to the second recipient after associating the link with the rights of the composer.

15. The computer program product of claim 9 further comprising instructions for:
providing a warning to the composer of the email if the at least one recipient includes a recipient not having sufficient rights to access the remote resource.

16. The computer program product of claim 9 wherein the remote resource is chosen from the group consisting of a server computer, a collaborative workspace, a database, and a website.

17. A computing system comprising:
at least one processor;
at least one memory architecture coupled with the at least one processor;
a first software module executed on the at least one processor and the at least one memory architecture, wherein the first software module is configured to receive an indication of an email being generated by a composer for at least one recipient, wherein the email includes a link to a piece of content on a remote resource;
a second software module executed on the at least one processor and the at least one memory architecture, wherein the second software module is configured to determine, prior to transmission of the email, the at least one recipient does not have sufficient rights to access the remote resource; and
a third software module executed on the at least one processor and the at least one memory architecture, wherein the third software module is configured to allow the recipient to access the remote resource via the link as a rights-proxy of the composer, wherein accessing the remote resource as a rights-proxy of the composer includes accessing the remote resource using credentials of the composer of the email.

18. The computing system of claim 17 wherein allowing the recipient to access the remote resource via the link as a rights-proxy of the composer includes associating the link with the rights of the composer.

19. The computing system of claim 18 wherein associating the link with the rights of the composer includes:
associating the link with the rights of the composer for a finite period of time.

20. The computing system of claim 18 wherein associating the link with the rights of the composer includes:
modifying the link to define the rights of the composer.

* * * * *